United States Patent [19]

Katzakian, Jr. et al.

[11] Patent Number: 5,665,783

[45] Date of Patent: Sep. 9, 1997

[54] RECYCLABLE REGENERANT FOR WEAK ACID ION EXHANGE RESINS

[75] Inventors: Arthur Katzakian, Jr., Elk Grove; Henry Cheung, Livermore; Charles E. Grix, Sacramento; Donald C. McGehee, Carmichael, all of Calif.

[73] Assignee: Ecotech, Rancho Cordova, Calif.

[21] Appl. No.: 598,462

[22] Filed: Feb. 8, 1996

[51] Int. Cl.$^6$ .................................................. C08F 08/42
[52] U.S. Cl. ........................ 521/26; 210/670; 210/674; 525/360; 525/364; 525/366; 525/384
[58] Field of Search ........................ 521/26; 210/670, 210/674

[56] References Cited

U.S. PATENT DOCUMENTS

| | | | |
|---|---|---|---|
| 3,939,071 | 2/1976 | Katzakian, Jr. | 210/24 |
| 4,071,446 | 1/1978 | Kunin . | |
| 4,083,782 | 4/1978 | Kunin . | |
| 4,116,860 | 9/1978 | Kunin . | |
| 4,298,477 | 11/1981 | Cole . | |
| 4,540,715 | 9/1985 | Waatti | 521/26 |
| 4,753,736 | 6/1988 | Reichgott . | |
| 5,474,704 | 12/1995 | Zaid | 252/188.12 |

OTHER PUBLICATIONS

W.E. Nervik, "*J. Phys. Chem.*," (1955) 59,690.
Rohm and Haas Technical Bulletin Fluid Process Chemicals (IE–209–74 of Jun. 1977) describing a product termed "Amberlite DP–1.".

*Primary Examiner*—Fred Zitomer
*Attorney, Agent, or Firm*—James M. Ritchey

[57] ABSTRACT

A composition for regenerating spent weak cation exchange resin and a method of utilization including salts of α-hydroxy carboxylic acids or o-hydroxy benzoic acids. The following steps are employed in cyclically regenerating polycarboxylic acid cation exchange resins: (a) utilizing a charged or alkali metal salt of polycarboxylate acid cation resin to soften water; (b) regenerating the spent resin in one step with an active regenerant of the α-hydroxy carboxylic acids or o-hydroxy benzoic acids to produce spent regenerant; (c) precipitating the polyvalent hard ions in the spent regenerant with sodium or potassium carbonate to reform the active regenerant; (d) separating the precipitate; and (e) concentrating the dilute active regenerate solution to its approximate initial concentration and recovering of water for process rinses.

21 Claims, 2 Drawing Sheets

RECYCLABLE REGENERANT FOR WEAK ACID ION EXHANGE RESINS

BACKGROUND OF THE INVENTION

1. Field of the Invention

Generally, a method for the regeneration of cationic exchange resins used for water softening is described. More specifically, by utilizing alkali (such as sodium and potassium) salts of α-hydroxy carboxylic or o-hydroxybenzoic acids, a method is presented for regenerating spent weak acid resins, such as alkaline earth polycarboxylates, back to their alkali salt form.

2. Description of the Background Art

Various ion exchange resins have been utilized in numerous procedures in industries, laboratories, general commercial facilities, and in private homes for many years to aid in softening hard water or generally in the removal of particular ions via ionic interactions. Hardness in household and industrial water is removed, in practice, by means of softening systems which replace the polyvalent ions such as $Ca^{2+}$ and $Mg^{2+}$ with sodium ion or other alkali metal ions. A commonly utilized process to accomplish this objective is to pass the water through an ion exchange column, wherein the polyvalent ions are exchanged for the sodium ions on the resin in the column. In time, the resin becomes saturated with the polyvalent ions and the column must be regenerated to put its resin back into the sodium form. Two general types of ion exchange resins are commonly used, the strong acid and weak acid resins. Polysulfonic acid resins are representative of the former and polyacrylic (or generally polycarboxylic) acid resins the latter.

The two types of ion exchange resins differ in three important respects which affect their applications. First they differ in their selectivity, i.e., the difference in affinity for sodium and for the polyvalent ions. Polyvalent hardness ions can be removed from brine solutions containing up to 5,000 ppm NaCl by using strong acid resins in the sodium form. However, with weak acid resins, hardness ions can be removed from brine solutions containing up to 50,000 ppm NaCl. High selectivity means more complete removal of the polyvalent ions. The second important difference between the two types of resins is the procedure for regeneration. Strong acid resins are usually regenerated with a large excess of brine, 3 to 5 times stoichiometry. The discharge of the resultant waste brine is environmentally undesirable and, in an increasing number of areas, discharge to a sewer is prohibited. Third, these strong acid resins do not satisfactorily remove the undesirable heavy metal ions such as $Fe^{2+}$ and $Cu^{2+}$ which are usually present. Hence, additional equipment is needed to accomplish this goal of $Fe^{2+}$ and $Cu^{2+}$ removal.

Although one step methods have been devised for certain limited situations, the regeneration of weak acid resins usually required a two step process. The existing one step processes have not proved to be as efficient as necessary for economic viability and, as a consequence, have not been widely used. Traditionally, the first step in the two step regeneration of weak acid resins involves the removal of the polyvalent ions with a dilute solution of a strong acid such as hydrochloric acid or its equivalent; this puts the resin in the hydrogen form. The second step is to put the resin into the sodium form for the water softening service cycle by treating the resin with a dilute solution of sodium hydroxide or sodium carbonate. Because two steps are entailed, cost is correspondingly higher than with one step methods, so that weak acid resins, in spite of their higher selectivity and capacity, are not usually employed in water softening.

In particular, disclosed in U.S. Pat. No. 4,753,736 is a method for a one step regeneration of a strong acid ion exchanger using citrate salts of volatile amines as the regenerant. These salts are utilized to remove undesirable cations from boiler water condensate. In general, the aqueous solutions of these regenerants comprise a volatile amine and an anion selected from anions which do not form precipitates with any cation present in the water that is treated. Because of the amines, however, this method is not suitable for the production of softened potable water.

A technical bulletin from Rohm and Haas (IE-209-74 of June 1977) describes a product termed "Amberlite DP-1." This product is a macroreticular polymethacrylic carboxylic acid cation exchange resin. Because of regeneration procedures used by Rohm and Haas, the waste load on the environment is minimized. The spent regenerant salt, soda lime, and sodium citrate are discarded directly to the sewer and can not be recycled economically.

Kunin in U.S. Pat. No. 4,083,782 discusses a one step procedure for regeneration of weak acid resins for conditioning acidic water containing hardness ions. Alkali salts of citric or fumaric acids, as well as sodium polyphosphate or sodium hexametaphosphate, were used as regenerants. The resin was claimed to be regenerated to 70–96% of its salt form. However, according to this patent, when using the citrate or fumarate regenerants, this means that the salt form of the resin is a mixture of sodium, calcium, and magnesium and only about 37.5% of the resin is regenerated to the sodium form which represents its actual softening capacity if a pH of less than 8.5 is to be achieved. The pH of the water from the service cycle using this process ranged from 7.0–9.5, depending upon the degree of regeneration.

Kunin provides in U.S. Pat. Nos. 4,071,446 and 4,116,860 a regenerant composition and method for regeneration of weak acid cation exchange resins that is suitable for use in residential buildings. The composition comprises alkali metal chloride, alkali metal carbonate, and a metal chelating polycarboxylate. The polycarboxylate has two or three acid groups. It is argued that the regeneration process yielded 70% regeneration but, as cited for the previous patent, the examples indicate that the regenerated resins have only about 37.5% of their capacity available for softening. The pH of the treated water ranged from 7.1 to 9.5, depending upon the degree if regeneration.

Described in U.S. Pat. No. 4,298,477 is a regeneration of zeolite based cation ion-exchange polishers. High-pressure boiler feed water is polished and softened with a cation ion-exchange resin, and the resin is regenerated with a readily ionizable salt of an amine-type corrosion inhibitor. This is not a suitable process for producing softened potable water since the amines would be present.

Even with the above referenced regeneration techniques, significant deficiencies endure with the existing procedures. The benefits of the subject regeneration procedure stand out over the currently available systems and include: 1) achieving nearly quantitative regeneration of the resin without using mineral acids, while recycling the regenerant and recovering the hardness minerals as granular solids; 2) generating no waste solution as embodied in the instant invention; 3) yielding softened water with a pH between 7.0 and 8.0 during the service cycle using a fully regenerated resin; and 4) utilizing a regenerant combination whose calcium and magnesium salt solutions remain precipitate or crystal free for more than a week at concentrations exceeding their individual solubilities up to a total concentration of about 2N.

Additionally and more specifically, the subject process has the following beneficial features:

1. Up to twice the volumetric capacity of conventional strong acid ion exchange resins.
2. Nearly quantitative single step regeneration of the spent resins.
3. Recycling of regenerants.
4. Efficient removal of hardness ions and heavy metal ions such as troublesome $Fe^{2+}$ from feed water streams.
5. Removal of hardness ions and heavy metal ions in useful carbonate, hydroxide and/or oxide forms.
6. Softened product water produced at a pH of approximately 7.5, using a fully regenerated polycarboxylic acid cation exchange resin.

The foregoing patents reflect the state of the art of which the applicant is aware and are tendered with the view toward discharging applicant's acknowledged duty of candor in disclosing information which may be pertinent in the examination of this application. It is respectfully submitted, however, that none of these patents teach or render obvious, singly or when considered in combination, applicant's claimed invention.

SUMMARY OF THE INVENTION

An object of the present invention is to provide a regenerant for weak acid ion exchange resins that is completely recyclable so that no liquid waste is produced.

Another object of the present invention is to supply an improved one step regeneration procedure for weak acid ion exchange resins used for water softening.

Yet another object of the present invention is to provide a process whereby the spent regenerant is restored to active regenerant status while removing hardness ions and heavy metal ions as granular carbonates, hydroxides, or oxides.

A further object of the present invention is to disclose a process of water softening in which the treated water is at a pH of 7.0–8.0, using a fully regenerated resin.

Still another object of the present invention is to furnish a kinetically stable, yet spent, regenerant solution containing calcium and magnesium in concentrations exceeding the individual spent regenerant solubilities up to a total solubility of about 2N that can be processed for recycling.

Yet still another object of the present invention is to produce finely divided calcium carbonate.

Disclosed in the subject invention is a weak acid exchange resin regeneration process that accomplishes the above mentioned objects by regeneration with a solution of a properly chosen alkali (usually sodium or potassium) salt or a mixture of such salts of carboxylic acids like alkali lactate and alkali glycolate. Quantitative regeneration of calcium and/or magnesium loaded weak acid resins can be accomplished by using these salts. The metal ions are recovered as salts of these carboxylic acids and are subsequently separated therefrom by precipitation and filtering as carbonates, oxides, or hydroxides after addition of sodium carbonate or sodium hydroxide, respectively. The regenerant solution is restored as a result and reconstituted and reconcentrated by water removal, ready for reuse. The recovered water is also reused as process rinse water and/or product water. Other metal ions (such as ions of aluminum, iron, copper, zinc, and the like) can be similarly recovered with the same regenerant.

Other objects, advantages, and novel features of the present invention will become apparent from the detailed description that follows, when considered in conjunction with the associated drawings.

DESCRIPTION OF THE PREFERRED EMBODIMENT

Figure 1A:
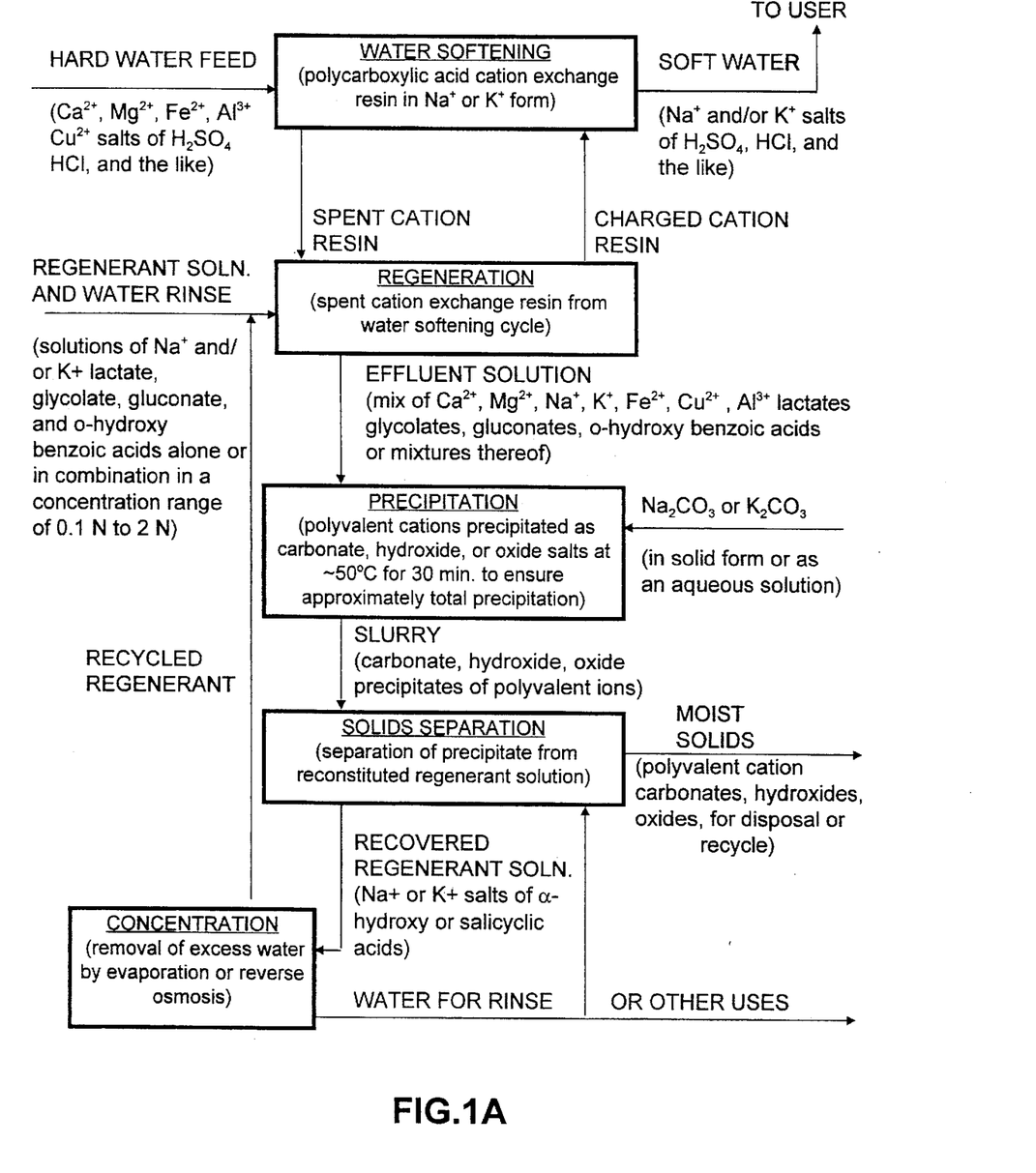
FIG. 1A is a detailed flow diagram of the subject water softening process.
Figure 1B:
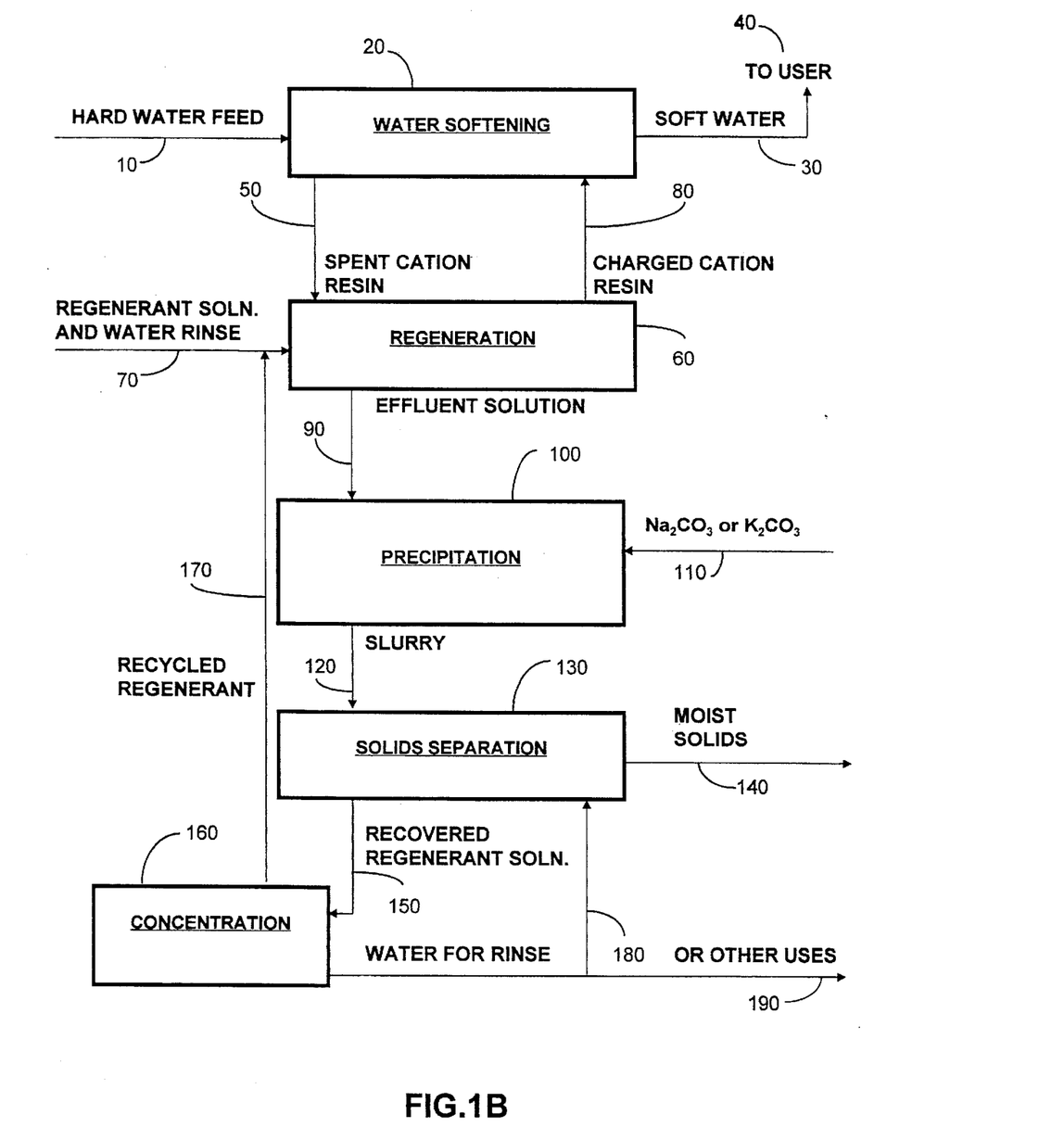
FIG. 1B is a summary flow diagram (with reference numbers indicated below) of the subject water softening process.

Referring now to FIGS. 1A and 1B, there is shown a preferred embodiment of a process that utilizes monovalent (i.e. $Na^+$ and $K^+$) cationic salts of α-hydroxy carboxylic acids and orthohydroxybenzoic acids that are capable of efficiently regenerating weak acid polycarboxylic acid ion exchange resins loaded with calcium, magnesium, aluminum and similar polyvalent metal ions including heavy metal ions. Preferably, the weak polycarboxylic acid ion exchange resin in ammonium ion or alkali metal ion (lithium, sodium, or potassium) form is converted to the polyvalent metal ion form by being in contact with an aqueous solution of the polyvalent metal ions. During regeneration, the polyvalent metal ions are displaced by the ammonium or the monovalent metal ions of the monocarboxylic acids of this invention so that the resin is recycled for further loading with polyvalent metal ions.

The spent (polyvalent metal ions in place of monovalent cations) regenerant solutions are treated with an amount of sodium carbonate or sodium hydroxide equivalent to the polyvalent ions in the spent regenerant solutions in order to precipitate these polyvalent ions as their carbonates or hydroxides. The precipitated compounds may be removed by solid separation methods such as filtration or centrifugation. The alkali or ammonium carbonate salt or hydroxide may be added as a granular solid or as a concentrated aqueous solution.

Thus, the spent regenerant solution is restored to its preregeneration state, ready to be reused as a regenerant solution. Periodically, some water removal will be necessary to return the regenerant solution to a proper concentration.

It is noted that the regenerant efficiency cannot be predicted from the dissociation constants of the carboxylic acids used in making these regenerants (see Table 1 below). Presented in Table 1 is a listing of a few organic carboxylic acids, including some of those used in this invention, and their acid dissociation constants:

TABLE 1

| Acid | Dissociation Constant, 20° C. | $pK_a$ |
|---|---|---|
| Acetic | $1.76 \times 10^{-5}$ | 4.75 |
| Formic | $1.77 \times 10^{-4}$ | 3.75 |
| Lactic | $1.48 \times 10^{-4}$ | 3.83 |
| Glycolic | $1.38 \times 10^{-4}$ | 3.86 |
| Gluconic | $1.38 \times 10^{-4}$ | 3.86 |

Although there is an order of magnitude difference between the dissociation constants for acetic and formic acid, regeneration of a calcium loaded polycarboxylic acid ion exchange resin (e.g., polyacrylic acid ion exchange resin from Rohm & Haas like C-433, or IRC-86 as it is now known) with a one fold stoichiometric excess of the sodium salt of each gave approximately the same poor result (see Table 2 below). These salts are only able to regenerate about 25–30% of the resin. By contrast, lactic acid (note that it is slightly less acidic than formic acid) in the sodium salt form, regenerates the same resin to about 80% of its capacity, also with a one fold stoichiometric excess. A 4.4 fold excess of potassium lactate regenerant will nearly quantitatively regenerate this resin to restore about 92% of the resin's theoretical capacity for softening hard water(see Table 2 below).

In the subject process little or no penalty is paid for using excess regenerant because the spent portion of the regenerant resulting from a column regeneration is recycled by the addition of an ammonium or alkali carbonate, preferably sodium carbonate, to the extent of hardness ions removed. The excess regenerant is carried from cycle to cycle insuring that quantitative or near quantitative regenerations take place. The hardness ions in the form of hydroxides, oxides, or carbonates are recovered as granular solids by standard solids separation techniques.

Also regenerable by the same regenerants are heavy metals which exchange even more favorably on the sodium salt form of these weak acid resins than do calcium or magnesium ions. Iron, copper, zinc, and the like ions are removed from feed waters ever at extremely low levels (several parts per million). The heavy metals in the form of the α-hydroxy acid salts are precipitated by the carbonate salt to give either metal hydroxides or carbonates. Since sodium carbonate hydrolyzes to give some hydroxide ion when in solution, the heavy metal, such as iron (III), will precipitate as the hydroxide compound rather than the carbonate because the hydroxide has significantly lower solubility product than does the carbonate. Between a pH of 3 and 7 it will exist as $Fe_2O_3$. In any case, the sodium or potassium carbonate will cause essentially quantitative precipitation of the polyvalent metal ions, and thereby, restore the regenerant back to the sodium or potassium salt form for reuse.

It is emphasized that the sodium, potassium, or their equivalent carbonate can be added as aqueous solutions, however, this increases the water content of the spent regenerant solution. This water and rinse water must be removed in the regenerant recycle step in order to restore the regenerant to a useful concentration. We have found the addition of sodium or potassium carbonate as a dry granular solid still causes complete precipitation of the polyvalent metals even though this precipitate would be expected to coat the granular sodium or potassium carbonate that has not yet dissolved and interfere with its solution and reaction. Apparently, this precipitate coating the carbonate powder does not effectively prevent it from dissolving and, at the worst, may only lower the rate of dissolution.

Additionally, we have discovered that the use of mixed sodium or potassium salts of α-hydroxy carboxylic acids, such as sodium or potassium lactate and sodium or potassium glycolate, when converted to the corresponding calcium and/or magnesium salts, produce kinetically stable solutions at concentrations many times the solubility if the salt were calcium glycolate, for example. This permits the effective use of regenerant concentrations in the about 0.5N to 2N range without fear of crystallization of the corresponding calcium or magnesium salts either on the column or in the receiver immediately after regeneration. The solutions can then be recycled without complication. Calcium salts of citric and fumaric acid are quite insoluble in water (0.05N and 0.18N, respectively) and attempts to regenerate calcium loaded polycarboxylic acid ion exchange resins with sodium salts of these acids resulted in solid deposition within the column as well as immediate crystallization in the receivers. However, when either of these salts are present in a small amount with a calcium α-hydroxy carboxylate salt, precipitation is delayed.

In the Kunin patents cited above, the spent regenerants are not recycled or stored, but are immediately discharged to the sewer. Precipitation of calcium citrate or fumarate is not a problem unless it occurs on the resin column during regeneration. If the regenerant stream flow rate is fast enough, precipitation on the column may not occur, but regenerant efficiency would drop significantly as a result of the reduced contact time. In the practical applications of the Kunin patents, small amount of sodium citrate and/or fumarate are used with large amounts of sodium or potassium chloride and small amounts of sodium or potassium carbonate. It is not clear why the carbonate ion present in the regenerant solution does not cause precipitation of the calcium as the carbonate when the regenerant comes in contact with these ions on the resin. Perhaps this is the reason that the regenerated softening capacity in these systems is only about 37% of the resin capacity as indicated in the Kunin patent. The presence of such precipitated compounds within a resin column would cause increased pH in the product water during the service cycle. The observed pH on using such regenerated resins was given as 8.5 in the Kunin patents, which tends to support the above stated supposition. In using the instant invention, no such complications are observed. Near quantitative regenerations are made using the regenerants of this invention without fear of precipitation of the removed calcium and/or magnesium salts. The softened water resulting from the use of such a regenerated resin in a water softening service cycle has a pH ranging from about 7.0 to 8.0.

Therefore, the subject process comprises some or all of the following steps: (a) utilizing a weak acid polycarboxylate cationic resins such as Rohm & Haas's C-433 (polyacrylic) or IRC-86, as it is now known, in either the sodium or potassium form to soften water; (b) regenerating the spent weak cationic exchange resin with active regenerants (the ammonium, sodium, or potassium salts of two select classes of weak organic monocarboxylic acids); (c) precipitating the polyvalent hard ions in the spent regenerant with sodium or potassium carbonate to reform the active regenerant; (d) separating the precipitate by a solids separation technique; and (e) concentrating the dilute regenerant solution to its approximate initial concentration and the recovery of water for process rinses and/or product water.

The only byproducts generated by this process are calcium and magnesium (and equivalent) carbonates or hydroxides. If heavy metals such as iron and copper are present in small quantities in the feed water stream, they will be efficiently removed by this process from the stream and removed from the spent resin along with the calcium and magnesium by the same sodium or potassium carboxylate regenerants. These heavy metals will usually precipitate as oxides or carbonates along with the hardness ions.

Specifically, a preferred scheme for the subject process is depicted in FIGS. 1A (detailed flow diagram) and 1B (summary flow diagram with appropriate reference numerals) in which a hard water feed 10 enters into a water softening reaction volume or vessel 20 containing the weak cation exchange ion resin. The hard water contains various single and combined salts of $H_2SO_4$, HCl, $HNO_3$, $H_3PO_4$, $H_2CO_3$, and the like with cautions such as $Na_+$, $K^+$, $NH_4^+$, $Ca^{2+}$, $Mg^{2+}$, $Al^{3+}$, $Fe^{2+}$, $Cu^{2+}$, and similar polyvalent ions. Usually the weak cation exchange resin is a polycarboxylic acid and preferably a polyacrylic acid cation exchange resin in the sodium, potassium, or equivalent form.

The ionic exchange occurs and softened water 30 having sodium, potassium, and like cationic salts of $H_2SO_4$, HCl, and the like is available for utilization by a user 40. Additionally, after nearly quantitative loading with hardness ions, the spent or used (little if any monovalent cations remaining) cation resin 50 from the softening cycle is now ready for regeneration 60 into a useful monovalent cationic or ionic sodium, potassium, or equivalent form.

The spent cation resin 50 is contacted with regeneration solution and water rinse 70 to recharge the cation resin 80 which is then ready for recycling into the water softening cycle. The regeneration solution contains alone or in combination sodium, potassium, and the equivalent salts of α-hydroxy acids such as lactate, glycolate, and gluconate or salts of o-hydroxybenzoic acids such as salicylic acid. Generally, the concentration range of the employed salts can be in the range of about 0.1N to 2.0N total regenerant, preferably in the range of about 0.50 to 1.50 total regenerant.

After charging the cation resin 80 in the regeneration step 60 the effluent solution 90 contains a mixture of monovalent and polyvalent cationic salts of the lactates, glycolates, gluconates, and salicylates. The effluent solution 90 is then subjected to precipitation 100 by the introduction of sodium, potassium, or equivalent carbonate in solid or aqueous solution form 110. The polyvalent cations are precipitated as the carbonate, hydroxide, or oxide salts. Although ambient temperatures are acceptable in the precipitation step 100, usually, to ensure rapid precipitation for the α-hydroxy salts, the precipitation reaction is conducted at an elevated temperature in the range of about 30° C. to 90° C., preferably from about 40° C. to 60° C., and more preferably at about 50° C. The period of time for the precipitation reaction is from about 5 minutes to two hours, preferably about 10 minutes to 60 minutes, and more preferably about 30 minutes.

A slurry 120 contains the carbonate, hydroxide, and oxide precipitates of the polyvalent cations and is transferred by standard techniques to a separation step 130. Usually, filtration is employed to separate the solids 140 from the liquid 150 in the separation step 130, however, other known or later developed separation methods are considered within the realm of this disclosure and include, but are not limited to, centrifugation. The liquid or filtrate 150 contains the reconstituted regenerant solution holding the soluble α-hydroxy carboxylic and o-hydroxybenzoic acid salts and is further processed. The dry solids 140 containing the polyvalent cationic carbonates, hydroxides, and oxides are ready for disposal or for recycling.

The filtrate 150 is concentrated 160 by suitable techniques such as evaporation, reverse osmosis, and the like. Generally and preferably, the water extracted from the concentration step 160 is utilized for rinse water 180 in the filtration step 130 or as product water for other suitable uses 190. In the alternative, when the sodium or potassium salts of the carboxylic acid is selected to be the α-hydroxy carboxylic acid, the excess water may be removed prior to the precipitation by a method of solution concentration.

Concentrated regenerant 170 is recycled with the regeneration solution 70 and into the regeneration 60. The subject process is repeated as often as is required for any particular task or tasks.

It is noted and stressed that experiments show that the efficiency of the salt of a carboxylic acid for regeneration is not related to the dissociation constant of the acid itself. The percentage recovery of calcium and/or magnesium removed by various carboxylic acid alkali metal salts is determined by the quantity of the metal removed by the salt plus any remaining material on the column that is removed by subsequent treatment with HCl to establish the total alkaline earth metal loaded on the column. Listed in Table 2 are the dissociation constants of the acids used, the normality of the regenerant used, the ratio of the regenerant equivalents used to equivalents of alkaline earth metal loaded on the column and the percent of the alkaline earth metal removed.

TABLE 2

Regeneration Efficiency and Organic Acid Dissociation Constant

| Regenerant | Dissociation Constant of Free Acid, 20° C. | Regenerant Normality | Regenerant/Metal Equivalent Ratio | Percent Regenerated |
| --- | --- | --- | --- | --- |
| Sodium Lactate | $1.48 \times 10^{-4}$ | 0.5 | 1.6 ($Ca^{2+}$) | 61 |
| Sodium Acetate | $1.76 \times 10^{-5}$ | 3.0 | 1.8 ($Ca^{2+}$) | 32 |
| Sodium Formate | $1.77 \times 10^{-4}$ | 2.0 | 2.2 ($Ca^{2+}$) | 26 |
| Potassium Lactate | $1.48 \times 10^{-4}$ | 1.0 | 3.0 ($Mg^{2+}$) | 82 |
| Potassium Lactate | $1.48 \times 10^{-4}$ | 1.0 | 4.0 ($Mg^{2+}$) | 87 |
| Potassium Lactate | $1.48 \times 10^{-4}$ | 1.0 | 5.4 ($Mg^{2+}$) | 92 |

The following experimental examples demonstrate the process more specifically and support the claims of the present invention. The experiments are cited only as examples and not by way of limitations, and the scope of the invention is not in any way restricted or limited by these examples.

EXAMPLES

Example 1

Regeneration with Solution of Sodium Glycolate

A glass column 2.54 cm in diameter is filled with a polyacrylic acid resin (C-433) in the calcium form to a depth of 30 cm. it was regenerated with a 0.5N solution of sodium glycolate. The flow rate Was set at 6 cc/min.

After about 400 cc of solution was put through, precipitate appeared in the effluent receiver and at the same time the column was plugged by precipitate. The experiment was abandoned and the column regenerated with 600 cc of 2.2N HCl to recover the resin.

This example illustrates the problem of regenerating these alkaline earth loaded polycarboxylic acid resins using acids whose alkaline earth salts have low solubility.

Example 2

Regeneration with Solution of Sodium Acetate

A column similar to that used in Example 1 was prepared. It was regenerated with a 3N solution of sodium acetate. The flow rate was set at 6 cc/min.

0.366 liter of regenerant, which contained 1.098 equivalent of sodium acetate was used. The recovered regeneration effluent contained 0.190 equivalent of calcium. Subsequently, the calcium remaining on the column was removed by regeneration with 554 cc of 2.05N HCl, which contained 1.136 equivalent of acid. The effluent collected contained 0.404 equivalent of calcium. The total recovery of calcium is the sum of 0.190 and 0.404 or 0.594 equivalent; hence, the recovery of calcium by regeneration with 3N sodium acetate is 32%.

This example demonstrates the poor regenerating ability of alkali acetates even though the corresponding alkaline earth salts are quite soluble.

Example 3

Regeneration with a Solution of Sodium Formate

A column similar to that in Example 1 was prepared. It was regenerated with a 2.166N solution of sodium formate. The flow rate was set at 6 cc/min. 0.510 liter containing 1.105 equivalent of sodium was used. The effluent contained 0.150 equivalent of calcium. After washing, the column was regenerated with 0.357 liter of 2.227N HCl containing 0.795 equivalent of acid. The effluent therefrom contained 0.315 equivalent of calcium. The total calcium, collected is the sum of 0.150 and 0.315 or 0.465 equivalent. The percentage recovery of calcium by regeneration with the sodium formate solution corresponds to the ratio of 0.150 to 0.465 or 32%.

Example 4

Solution Stability Measurements of Calcium Salts of Mixed α-Hydroxy Carboxylic Acids Measurements of solution stabilities of calcium salts of mixed α-hydroxy acids were accomplished by first preparing a preset solution mixture of sodium α-hydroxycarboxylates and combining this solution with an equivalent amount of $CaCl_2$ solution. The resulting solution was adjusted with water to give the desired final overall concentration of $Ca^{2+}$ and hydroxycarboxylate ions. Time was measured to the initiation of crystal formation. The results of this experiment are given in Table 3.

TABLE 3

| Sample Number | 1 | 2 | 3 |
|---|---|---|---|
| $Ca^{2+}$ Gluconate/$Ca^{2+}$ Lactate, Equivalent Ratios | 1.00/0.00 | 0.50/0.50 | 0.25/0.75 |
| Time to Crystal Formation, in Hours | <20 | >100 | <20 |
| Sample Number | 4 | 5 | 6 |
| $Ca^{2+}$ Glycolate/$Ca^{2+}$ Gluconate, Equivalent Ratios | 0.25/0.75 | 0.50/0.50 | 0.75/0.25 |
| Time to Crystal Formation, in Hours | ~2 | >100 | <20 |
| Sample Number | 7 | 8 | 9 |
| $Ca^{2+}$ Glycolate/$Ca^{2+}$ Lactate, Equivalent Ratios | 0.33/0.67 | 0.50/0.50 | 0.67/0.33 |
| Time to Crystal Formation, in Hours | >120 | 15 | 3 |

Example 5

Regeneration with Solution Containing a Mixture of Sodium Lactate and Sodium Gluconate A column similar to that used in Example 1 was prepared. It was regenerated with a solution containing 0.75N sodium lactate and 0.75N sodium gluconate. The flow rate was set at 6 cc/min.

0.738 liter of regenerant, which contained a total of 1.108 equivalents of regenerant consisting of 0.554 equivalent each of sodium lactate and sodium gluconate was used. The recovered regenerant effluent contained 0.402 equivalent of calcium. Subsequently, the calcium remaining on the column was removed by regeneration with 0.532 liter of 2.067N HCl, which contained 1.100 equivalent acid. The effluent collected contained 0.148 equivalent of calcium. The total recovery of calcium is the sum of 0.402 and 0.148 or 0.550 equivalent; hence, the recovery by regeneration with the mixed regenerant is 73%.

Example 6

Regeneration of an Ionac "cc" Column Containing a Mixture of Sodium Lactate and Sodium Gluconate This experiment is similar to Example 5 except that Ionic "cc" resin (batch 1817 purchased from Sybron), which is macro-reticular, was used. The as received resin in the sodium form was acidified with 0.530 liter of 2.227N HCl. The approximately 1 inch diameter column containing the resin in the hydrogen form was washed until the effluent water was down to 7.2 ppm dissolved solid. The final height of the column was 25 cm.

The column was then buffered with 2.080 liters of 0.537N sodium hydroxide at a flow rate of 10 cc/min. A total of 1.117 equivalent of sodium hydroxide was used. The collected effluent contained 0.643 equivalent of sodium hydroxide; hence, the column capacity for sodium was 0.474 equivalent.

The resin was subsequently loaded with 2.002 liter of a 0.2875N calcium chloride solution containing 0.576 equivalent of calcium at a rate of 10 cc/min. The effluent collected contained 0.48 equivalent; hence, the column capacity for calcium was 0.528 equivalents by difference. Note that the column capacity for calcium is greater than for sodium. This could result from calcium loading onto the resin as the half carboxylate salt.

After washing, the column was regenerated with 0.6762 liter of a solution containing 0.75N sodium lactate and 0.75N sodium gluconate as in the case of Example 5 above. The flow rate was set at 6 cc/min. The regenerant used contained 0.504 equivalent each of sodium lactate and sodium gluconate. The effluent collected contained 0.394 equivalent of calcium.

The column was washed and an additional 0.386 liter of regenerant containing 0.290 equivalents each of sodium lactate and sodium gluconate was introduced. The collected effluent contained 0.08 equivalent of calcium. The total calcium recovered by the two regeneration steps was, therefore, 0.394 plus 0.080 or 0.474 equivalent, which was equal to the total sodium originally on the resin.

After washing, the column was regenerated with HCl and the effluent collected therefrom containing 0.070 equivalent of calcium. The total calcium collected is, therefore, 0.474 plus 0.070 or 0.544 equivalent. The percentage recovery by the mixed regenerant solution corresponds to the ratio of 0.474 to 0.544 or 87%. Since the measured calcium input was 0.528 equivalent, its material balance has an error of 3% due to accumulated inaccuracies in measurements resulting from a large number of analyses.

Example 7

Regeneration with a Solution of Potassium Lactate

The column from Example 6, which contained Ionac "cc" resin was buffered with 0.546N NaOH and loaded with 0.486N $MgCl_2$. The column retained 0.464 equivalents of Mg.

The column was regenerated with 1.0 liter of 1.049N potassium lactate 0.464 equivalents of Mg were recovered in the effluent. After the column was washed down to 137 ppm, regeneration was continued with 477 mL of 1.049N potassium lactate. An additional 0.0255 equivalents of Mg was recovered. The column was washed again and regenerated further with 600 mL of 1.063N potassium lactate to recover yet another 0.0236 equivalents of Mg. The total Mg recovered is, thus, 0.459 equivalents, which corresponds to 99% of the Mg loaded. The object of the repeated regenerations was to determine whether an excessive amount of regenerant would achieve more complete regeneration. It is apparent that, indeed, additional regenerant beyond the stoichiometric amount would remove more Mg from the column, but at a decreasing rate.

Subsequently, the column was regenerated with approximately one equivalent of 2.227N HCl. 0.042 equivalents of Mg, about 9% of the original mg, were recovered. The obvious error in material balance can be attributed to inaccuracies in analysis. Mg concentrations were determined by titration with 2.593N sodium carbonate solution. It was discovered that this procedure tends to yield results somewhat higher than titrations with NaOH.

Example 8

Regeneration with a Solution Containing 1N Sodium Lactate and 1N Sodium Gluconate The column from Example 3, which contained C-433 resin, was first loaded or buffered with NaOH and then loaded with $CaCl_2$ and regenerated with a 1.969N solution containing equal concentrations of sodium lactate and sodium gluconate. 1170 mL of regenerant solution containing 2.304 equivalents of sodium were used. The equivalents of sodium used is over 4.5 times the amount of calcium in the column. 0.445 equivalents of calcium were recovered. Subsequently, an additional 0.096 equivalents of calcium were removed from the column with HCl. Accordingly, 82% of the calcium was recovered by regeneration with the nearly 2N mixed regenerant solution.

Example 9

Regeneration with Recycled Regenerant Solution

The column from Example 8 was loaded with NaOH and displaced with 0.549 equivalents of $CaCl_2$. 1220 mL of the effluent from the regeneration in Example 8 were used to recover the calcium. The effluent was 1.455N with respect to sodium lactate and sodium gluconate in equimolar concentrations. 1.775 equivalents of sodium, which corresponds to over three times the amount of calcium in the column, were utilized. The calcium recovered by regeneration was 0.454 equivalents or 83% of that loaded.

Example 10

Solution Stability Test of Mixed Calcium Salts of Salicylic and 3-Methylsalicylic Acids The purpose of this experiment is to determine whether or not mixed calcium salts of salicylic and 3-methyl salicylic acids will stay in solution, and if so, at what mole ratios. In this test the calcium salts were formed in situ by combining a solution of the mixed sodium salts of the two salicylic acids with an equivalent amount of calcium chloride solution. The test was also done on each acid salt independently to measure its solution stability. Table 4 below gives the molar compositions of the calcium salts and their individual behavior regarding solution stability.

TABLE 4

| Calcium Salicylate and 3-Methyl salicylate Solution Stabilities | | | | | |
|---|---|---|---|---|---|
| Sample | 1 | 2 | 3 | 4 | 5 |
| $Ca^{2+}$ salicylate, eq. | 0.75 | 0.50 | 0.25 | 0.50 | — |
| $Ca^{2+}$ 3-methyl salicylate, eq. | 0.25 | 0.50 | 0.75 | - | 0.50 |
| Crystal formation time, hrs. | ~20 | >1000 | ~6 | 0 | 0 |

Clearly, an equimolar mixture of these two calcium salts produces more than adequately stable solutions to permit processing of similarly constituted solutions resulting from a spent water softening column regeneration. When only one of the salts is present, crystallization takes place immediately upon formation of the calcium salt.

Example 11

Regeneration with an Equimolar Mixture of Sodium Salicylate and Sodium 3-Methylsalicylate The column used in Example 3, which contained Ionac "cc" resin, was buffered with NaOH and loaded with 0.497 equivalents of calcium. It was regenerated with 1420 mL of a 0.994N solution containing equal concentrations of sodium salicylate and sodium 3-methylsalicylate. The amount of sodium used, therein, was 1.411 equivalents of 2.8 times the calcium in the column. 0.244 equivalents of calcium were recovered by regeneration: correspondingly, the recovery was 49%. The salicylates do not perform as well as the α-hydroxy carboxylates, but they perform significantly better titan the acetates and formates.

Example 12

Regeneration with a Recycled Sodium Salicylate/Sodium 3-Methylsalicylate Solution Sodium carbonate was added to the regeneration effluent from Example 11 to precipitate the calcium contained therein as calcium carbonate. The filtrate, which was 0.996N with respect to sodium and contained equal amounts of salicylate and 3-methylsalicylate, was used for regeneration.

The column used in Example 11, which contained Ionac "cc" resin, was regenerated with HCl and buffered with NaOH. It was then) loaded with 0.643 equivalents of Mg. Regeneration resulted in the recovery of 0.256 equivalents of Mg, which corresponds to 40% of the Mg loaded.

Example 13

Solution Stability Measurements of Calcium Salts of Glycolic and Salicylic Acid Mixtures In the same fashion that Example 4 was conducted, mixtures of calcium salts of glycolic acid and salicylic acid were evaluated for solution stability to see if stability is achieved regardless of the salts mixed. This clearly was not the case as is shown is shown by the results given in Table 5 below. No hard and fast rule can be given to predict such behavior except that keeping within the same family of carboxylic acids might serve as a rule of thumb.

TABLE 5

| Sample Number | 1 | 2 | 3 |
|---|---|---|---|
| Ca$^{2+}$ Glycolate/Ca$^{2+}$ Salicylate, Equivalent Ratios | 0.75/0.25 | 0.50/0.50 | 0.25/0.75 |
| Time to Crystal Formation, in Hours | <<1 | <<1 | <<1 |

Example 14

Precipitation of Hardness Ions to Recover Regenerants

The precipitation of calcium and magnesium salts with sodium or potassium carbonate from a spent regenerant solution containing calcium and or magnesium salts of α-hydroxy carboxylic acids, was found not to proceed quantitatively at ambient temperature within a reasonable time interval. We have found, however, that the clear filtrate resulting from the ambient temperature precipitation and filtration will produce additional precipitate if heated to ~50° C. In fact, we have found that conducting the precipitation at 50° C. and holding at that temperature for 30 minutes produces quantitative precipitation. Additional heating of the filtrate from this precipitation even to 80° C. does not produce any more precipitate. Quantitative ambient temperature precipitation was observed (wherein "quantitative" is defined as approximately >98%), however, for calcium and magnesium salts of carboxylic acids such as acetic and even salicylic.

The calcium carbonate resulting from the precipitation of calcium from its α-hydroxy carboxylic acids salts is extremely fine or finely divided, probably sub-micron in size as estimated by feel. By contrast, the same precipitate resulting from either calcium acetate or calcium salicylate was visibly and tactily much coarser.

It is noted that currently there is a definite market for sub-micron calcium carbonate, for example, as a filler for paper and pigment for paint. The value of such a material is equal to or greater than the cost of the sodium carbonate used to make it. This process, therefore, could be cost neutral with respect to chemicals and little or no cost required for waste disposal. Since the regenerants are recycled and non-toxic, this process satisfies all environmental requirements, and, because of higher capacities and efficiencies, permits longer intervals between service cycles. This decreases cost of operation and reduces use of service vehicles for a comparable amount of water softening with currently used softening systems.

Example 15

Regeneration with Sodium Lactate and Sodium Gluconate in Equal Molar Amounts

These related experiments utilized Rohm and Haas Amberlite IRC-86 (previously named C-433) weak cation exchange resin (Lot #2-145895). The resin was conditioned by performing three cycles of loading and regeneration with 1 normal solutions of sodium hydroxide and hydrochloric acid, respectively. The resin was utilized in the sodium ion state.

The first experiment was to verify the calcium ion loading capacity for C-433 resin (now available as IRC-86). 250 cc of the resin (Na$^+$ form) were placed in a 2 cm (i.d.)×100 cm glass chromatographic column. The resin had a measured bed height of 78.7 cm which yielded a calculated resin volume of 247 cc. A 0.113N solution of calcium chloride was fed onto the column at a feed rate of 60 mL/min. The feed was stopped when the effluent calcium concentration equaled the feed calcium concentration (resin exhaustion or spent resin). The column was regenerated with 1 equivalent solution of hydrochloric acid. Analysis of the effluent showed 0.554 equivalents of calcium had been loaded onto the resin and this value was considered to be the effective capacity of the C-433 resin bed for Ca$^{2+}$ removal.

Into a second glass column of equal dimensions were placed 250 mL of new C-433 resin (sodium form). This resin was loaded to exhaustion with 0.10N calcium chloride solution. Analysis of the effluent yielded a calculated Ca$^{2+}$ loading of 0.547 equivalents of calcium providing excellent reproducibility.

This second resin bed was regenerated with a 1.60N solution containing equal molar amounts of sodium lactate and sodium gluconate. A 99% regeneration of the resin was achieved utilizing a five fold excess over the measured exchange capacity of the C-433 resin.

The above regenerated resin was loaded to exhaustion with a 0.090N solution of calcium chloride. The product water during the calcium loading cycle had a measured pH of 7.0 to 7.2. Analysis of the effluent showed a resin loading of 0.540 equivalents of calcium. This is 99% of the original measured resin capacity.

Example 16

Regeneration of Ca$^{2+}$ Loaded Polyacrylic Acid Resin with an Equimolar Mixture of Sodium Salicylate and Sodium Methylsalicylate A 5.21 cm diameter ×61 cm long PVC column was filled to a bed height of 15.5 inches with IRC-86 (formerly C-433) polyacrylic acid resin in the Na$^+$ form. The resin was loaded to exhaustion with Ca$^{2+}$ by passing 25.2 liters of 0.100N CaCl$_2$ solution through the resin bed. Analysis of the collected effluent indicated that 1.84 equivalents of Ca$^{2+}$ had been loaded onto the resin.

The Ca$^{2+}$ loaded resin was converted back to the Na$^+$ form by feeding 6.30 liters of a 1.59N solution containing equimolar quantities of sodium salicylate and sodium methylsalicylate over the resin. This is a five fold regenerant quantity to the equivalents of Ca$^{2+}$ known to have been loaded onto the resin in the column. This regenerant was fed through the resin bed at a rate of about 31 cc per minute. The effluent from the column was collected and combined with the 2.0 liters of column washings. Analysis of this solution indicated that 1.45 equivalents of Ca$^{2+}$ were removed (79% of what was present on the resin bed).

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A process for regenerating spent weak cationic exchange resin comprising contacting the spent cationic exchange resin with a solution containing a monovalent cationic salt of a carboxylic acid selected from a group consisting of α-hydroxy carboxylic acids and hydroxylated benzoic acids.

2. A process according to claim 1, wherein said monovalent cationic salt contains sodium or potassium and said carboxylic acid is said α-hydroxy carboxylic acid.

3. A process according to claim 2, wherein said α-hydroxy carboxylic acid is selected from a group consisting of lactic acid, glycolic acid, and gluconic acid.

4. A process according to claim 1, wherein said monovalent cationic salt contains sodium or potassium and said carboxylic acid is said hydroxylate benzoic acid.

5. A process according to claim 4, wherein said hydroxylated benzoic acid is o-hydroxybenzoic acid.

6. A process for regenerating a spent polycarboxylic acid cation exchange resin having associated polyvalent cations comprising the steps of:
   a) contacting the spent polycarboxylic acid cation exchange resin with a regenerant solution containing one or more monovalent cationic salts of a carboxylic acid selected from a group consisting of α-hydroxy carboxylic acids and hydroxylated benzoic acids, thereby producing alkali ion charged polycarboxylic acid cation exchange resin and
   b) separating said charged polycarboxylic acid cation exchange resin from an effluent solution containing a mixture of monovalent and polyvalent cationic salts of said carboxylic acid.

7. A process according to claim 6, further comprising recycling said effluent solution for regenerating additional spent polycarboxylic acid cation exchange resin.

8. A process according to claim 7, wherein said recycling comprises the steps of:
   a) precipitating hardness cations from said effluent solution with the addition of monovalent cationic carbonate, thereby generating a slurry containing precipitates of said polyvalent cations;
   b) separating said slurry into said precipitates of said polyvalent cations and a filtrate containing said monovalent cationic salts of said carboxylic acid;
   c) concentrating said filtrate by removing excess water; and
   d) utilizing said concentrated filtrate containing said monovalent cationic salts of said carboxylic acid to regenerate additional spent polycarboxylic acid cation exchange resin.

9. A process according to claim 8, further comprising the step of employing said removed excess water as a rinse in said separation step.

10. A process according to claim 8, wherein said regenerant solution has a total regenerant concentration of said sodium or potassium salts of said carboxylic acid of about 0.1N to 2N.

11. A process according to claim 8, wherein said precipitation occurs at a temperature of about 30° C. to 90° C. for about 5 minutes to two hours.

12. A process according to claim 8, wherein said precipitation occurs at a temperature of about 50° C. for about 30 minutes.

13. A process according to claim 6, wherein said α-hydroxy carboxylic acid is selected from a group consisting of lactic acid, glycolic acid, and gluconic acid.

14. A process according to claim 6, wherein said hydroxylated benzoic acid is o-hydroxybenzoic acid.

15. A process for regenerating spent polyacrylic acid cation exchange resin having associated polyvalent cations obtained from softening hard water, comprising the steps of:
   a) contacting the spent polyacrylic acid cation exchange resin with a regenerant solution containing one or more sodium or potassium salts of a carboxylic acid selected from a group consisting of α-hydroxy carboxylic acids and hydroxylated benzoic acids, thereby producing charged polyacrylic acid cation exchange resins;
   b) separating said charged polyacrylic acid cation exchange resin from an effluent solution containing a mixture of monovalent and polyvalent cationic salts of said carboxylic acid;
   c) precipitating said effluent solution with the addition of sodium or potassium carbonate, thereby generating a slurry containing precipitates of said polyvalent cations;
   d) separating said slurry into said precipitates of said polyvalent cations and a filtrate containing soluble sodium and potassium salts of said carboxylic acid;
   e) concentrating said filtrate by removing excess water;
   f) utilizing said concentrated filtrate containing said soluble sodium and potassium salts of said carboxylic acid to react with the additional spent polyacrylic acid cation exchange resin; and
   g) employing said removed excess water as a rinse in said separation step.

16. A process according to claim 15, wherein said regenerant solution has a total regenerant concentration of said sodium or potassium salts of said carboxylic acid of about 0.1N to 2N.

17. A process according to claim 15, wherein said precipitation occurs when said sodium or potassium salts of said carboxylic acid is selected to be said α-hydroxy carboxylic acid at a temperature of about 30° C. to 90° C. for about 5 minutes to two hours.

18. A process according to claim 15, wherein said precipitation occurs when said sodium or potassium salts of said carboxylic acid is selected to be said α-hydroxy carboxylic acid at a temperature of about 50° C. for about 30 minutes.

19. A process according to claim 15, wherein said α-hydroxy carboxylic acid is selected from a group consisting of lactic acid, glycolic acid, and gluconic acid.

20. A process according to claim 15, wherein when said sodium or potassium salts of said carboxylic acid is selected to be said α-hydroxy carboxylic acid said excess water is removed prior to said precipitating by a method of solution concentration.

21. A process according to claim 15, wherein said hydroxylated benzoic acid is o-hydroxybenzoic acid.

* * * * *